United States Patent [19]

Bonner et al.

[11] 3,876,811

[45] Apr. 8, 1975

[54] READY-TO-EAT CEREAL

[75] Inventors: William A. Bonner; Max R. Gould, both of Barrington; Thomas E. Milling, Lake Zurich, all of Ill.

[73] Assignee: The Quaker Oats Company, Chicago, Ill.

[22] Filed: July 9, 1973

[21] Appl. No.: 377,519

[52] U.S. Cl. .................... 426/93; 426/96; 426/103; 426/141; 426/142; 426/307; 426/309
[51] Int. Cl. ............................ A23g 3/00; A23l 1/10
[58] Field of Search ....... 426/93, 96, 103, 141, 142, 426/145, 302, 307, 309

[56] References Cited
UNITED STATES PATENTS

| | | | |
|---|---|---|---|
| 2,868,647 | 1/1959 | Vollink | 426/302 |
| 3,259,503 | 7/1968 | Jan et al. | 426/141 |
| 3,318,706 | 5/1967 | Fast | 426/302 |
| 3,464,828 | 9/1969 | Cummisford | 426/250 |
| 3,582,336 | 6/1971 | Rasmusson | 426/93 |

Primary Examiner—Raymond N. Jones
Attorney, Agent, or Firm—Donnie Rudd

[57] ABSTRACT

A ready-to-eat of natural ingredients is disclosed having a base made of cereal flakes, coconut, milk solids, and edible nuts, with a coating made of brown sugar, pure non-hydrogenated vegetable oil, and sugar solution with a specified density and moisture content.

34 Claims, No Drawings

READY-TO-EAT CEREAL

BACKGROUND OF THE INVENTION

1. Field of the Invention

This invention relates to a ready-to-eat cereal product of natural ingredients which is distinguished in that it is substantially free from additives and from severe processing conditions.

Description of the Prior Art

Many ready-to-eat cereals have been developed and sold in recent years. These cereals all have different types of additives which provide for prevention of staling and prevention of oxidation as well as preservation of the product. None of the cereals have been developed which are substantially free of these additives and preservatives. Likewise, most of the cereal being sold today has been subjected to substantial types of processing which significantly alters the product. A substantial number of people are desirous of having a cereal product which is completely free of all added chemical ingredients. This would be a product which uses natural ingredients to effect its own preservation and provides for its own shelf life.

A large number of people are very much desirous of having a product which is natural, that is, which does not have added chemicals. The prior art, to this date, has not substantially provided a ready-to-eat cereal product which is free of these ingredients, but which also has a very good taste and which id desirable for eating. The present product overcomes all of the objections to the prior art.

SUMMARY OF THE INVENTION

It is an object of this invention to provide a ready-to-eat cereal product completely free of chemical additives and comprised solely of natural ingredients.

It is another object of this invention to provide a cereal free of chemical additives, but which also is in and of itself stable against staling and rancidity.

It is another object of this invention to provide a ready-to-eat cereal product of natural ingredients which is not subjected to processing conditions which substantially alter the natural nature of the component parts.

The objects of this invention are accomplished by a ready-to-eat cereal of natural ingredients, said cereal comprising; a base and a coating thereon, said base comprising from about 30 to about 50 parts by weight cereal flakes, from about 5 to about 8 parts by weight coconut, from 0 to about 10 parts by weight milk solids, and from about 5 to about 9 parts by weight edible nuts; said coating comprising from about 12 to about 24 parts by weight brown sugar, from about 5 to about 15 parts by weight of pure non-hydrogenated vegetable oil, and from about one-half to about 3 parts by weight of a sugar solution; said cereal having a density of from about 0.15 to about 0.35 oz. per cubic inch and a moisture content of from about 1.0 to about 3½ percent by weight.

In a preferred embodiment of this invention, the objects of the invention are accomplished by a ready-to-eat cereal of natural ingredients, said cereal comprising from about 23 parts to about 27 parts by weight oat flakes, from about 11 parts to about 14 parts by weight wheat flakes, from about 6 parts to about 8 parts by weight almonds, from about 5 to about 8 parts by weight coconut, from about 5 to about 8 parts by weight milk solids, from about 14 parts to about 17 parts by weight brown sugar, from about 8 parts to about 11 parts by weight coconut oil, from about one-fourth parts to about 2½ parts by weight honey, from about 5 parts to about 13 parts by weight raisins, and from about 5 parts to about 13 parts by weight dates; wherein the density of said cereal is from 0.23 to 0.27 oz. per cubic inch and wherein the moisture content of said cereal is from about 1.5 percent to about 5.0 percent by weight.

In still another preferred embodiment of the invention the objects of this invention are accomplished by a ready-to-eat cereal of natural ingredients, said cereal comprising from about 22 parts to about 28 parts by weight oat flakes, from about 8 parts to about 22 parts by weight wheat flakes, from about 7 parts to about 9 parts by weight almonds, from about 6 parts to about 8 parts by weight coconut, from about 6 parts to about 8 parts by weight milk solids, from about 17 parts to about 20 parts by weight brown sugar, from about 7 parts to about 13 parts by weight coconut oil, and from about one-fourth parts to 2½ parts by weight honey; wherein the density of said cereal is from about 0.16 to about 0.32 oz. per cubic inch and wherein the moisture of said cereal is from about 1.5 percent to about 3.5 percent by weight.

The objects of this invention are further accomplished by a process for producing a ready-to-eat cereal of natural ingredients, said process comprising:

a. preparing a base by admixing from about 30 parts to about 50 parts by weight cereal flakes with from about 5 parts to about 8 parts by weight coconut, from 0 parts to about 10 parts by weight milk solids, and from about 5 parts to about 9 parts by weight edible nuts;

b. preparing a coating material by admixing from about 12 parts to about 24 parts by weight brown sugar, from about 5 parts to about 15 parts by weight pure, non-hydrogenated vegetable oil; from about one-half parts to about 3 parts by weight sugar solution and sufficient water to make the coating material liquid;

c. heating the coating material to a temperature of from about 140°F. to about 160°F.;

d. enrobing the coating material onto the base; and e. drying the enrobed base to below 3½ percent by weight moisture to produce a product having a density of from about 0.15 oz. per cubic inch to about 0.35 oz. per cubic inch.

In a preferred embodiment, the objects of this invention are accomplished by a process for producing a ready-to-eat cereal product of natural ingredients, said process comprising:

a. preparing a base by admixing from about 22 parts by weight to about 28 parts by weight oat flakes, from about 8 parts by weight to about 22 parts by weight wheat flakes, from about 7 parts by weight to about 9 parts by weight almonds, from about 6 parts by weight to about 8 parts by weight coconut, and from about 6 parts by weight to about 8 parts by weight milk solids;

b. preparing a coating material by admixing from about 17 to about 20 parts by weight brown sugar, from about 7 parts by weight to about 13 parts by weight coconut oil, and from about one-fourth parts by weight to about 2½ parts by weight honey, with sufficient water to make the coating liquid.

c. heating the coating material to a temperature of from about 140°F. to about 160°F.;

d. enrobing the coating material onto the base; and e. drying the enrobed base to below 3½ percent by weight moisture to give a product having a density of from 0.15 oz. per cubic inch to 0.35 oz. per cubic inch.

Of particular importance is the embodiment of my process wherein the enrobed base is formed into a sheet prior to drying and then subdivided after drying.

The new and novel ready-to-eat cereal product of this invention has therein from 30 to 50 parts by weight cereal flakes. The cereal flakes of this invention are the commonly found cereal flakes which have not been substantially altered by chemical adulteration. The flaking of cereal is well known to the cereal industry and it is intended that this invention include cereal flakes made from processes well known but which do not include the addition of unnatural or chemical additives. Of particular importance in this invention are cereal flakes selected from the group oat flakes, wheat flakes, barley flakes, and mixtures thereof. It has been found to be of particular desirability to utilize either oat flakes or a combination of oat flakes and wheat flakes in this invention.

The product of this invention also includes from about 5 to about 8 parts by weight coconut. The coconut of this invention is coconut unprocessed except for comminution into a size desirable for addition into the product. It is substantially free from known additives. The product also includes from 0 to about 10 parts by weight milk solids. The milk solids are milk solids which are well known to the industry but which are free from chemical adulteration. Some amount of milk solids is important to the invention, and it is highly desirable that at least some amount of a milk solid be added. This contributes to the protein as well as provides some binding characteristics which are highly desirable. No more than about 10 parts by weight of the milk solids should be used in the product, however.

The product also includes from about 5 to about 9 parts by weight edible nuts. Of particular importance in this invention as an edible nut are almonds. The almonds are subdivided or shredded to a small particle size for the inclusion in the product. The invention is not limited, however, to almonds and other nuts could be used, even though they do not provide the exact characteristics of the almonds. For instance, peanuts and pecans would likewise be acceptable, although not the preferred embodiment of the invention.

The combination of the cereal flakes with the coconut, milk solids and edible nuts provides the base portion of the ready-to-eat cereal. This base portion is coated or enrobed with a coating which comprises the other ingredients.

In the coating is included from about 12 to about 24 parts by weight brown sugar. By use herein of the term "brown sugar" it is intended not at all to mean refined or white sugar, but rather brown sugar which is substantially free from the refining process. This is the brown sugar or natural sugar from the sugar mills.

The coating also includes from about 5 to about 15 parts by weight pure, non-hydrogenated vegetable oil. In other words, the vegetable oil must be completely free of any type of processing chemical modification for stabilization. The vegetable oil must be pure in that it must not have additives added therein for use in preservation. The vegetable oil must also not be hydrogenated. In the preferred embodiment of this invention, the pure, non-hydrogenated vegetable oil is coconut oil. However, it may be desirable to substitute for the coconut oil a member selected from the group comprising palm oil, sesame oil, corn oil, cottonseed oil and soybean oil. Other pure, non-hydrogenated vegetable oils may also be used.

The coating of the ready-to-eat cereal also includes from about one-half to about 3 parts by weight sugar solution. By use of the term "sugar solution" we intend to mean solutions made from natural sugars which have been unprocessed or else natural syrup. To be included in this group are honey, which is the preferred embodiment, and molasses, maple syrup, and other succrose solutions.

The cereal product of this invention has a density of from about 0.15 to about 0.35 oz. per cubic inch. It is necessary to stay within this critical density requirement in order to provide the type of product desired. Densities outside this range do not have the same desirable filling characteristics of the product of the present invention. The product of the present invention must also have a moisture content of from about 1.0 to about 3½ percent by weight when no fruit is added. If fruit, such as raisins and dates, is added, then it will raise the moisture content so that the final overall moisture content is from about 1.0 to about 5.0 percent by weight. Substantial deviation from the specified moisture content will produce a product which is not desirable.

The coated base, or ready-to-eat cereal product of this invention may also include from 5 to 25 parts by weight dehydrated fruit. The dehydrated fruit is optional but is highly desirable and is a preferred embodiment of this invention. Of particular desirability as a dehydrated fruit are dehydrated raisins, dates, and mixtures thereof. Whatever the dehydrated fruit, it must be emphasized that the fruit must not have any chemical addition in the processing thereof. In other words, the dehydrated fruit must be a fruit which simply has been dried prior to inclusion in the product. No traceable chemical addition thereto can be tolerated.

The process of this invention includes the preparation of a base by admixing from about 30 parts to about 50 parts by weight cereal flakes with from about 5 parts to about 8 parts by weight coconut, from 0 to about 10 parts by weight milk solids, and from about 5 parts to about 9 parts by weight edible nuts. The definition of the cereal flakes, coconut, milk solids, and edible nuts are hereinbefore described. These products can be admixed simply by placing them in a tumbler and mixing them together.

In the process, a coating material is prepared by admixing from about 12 parts to about 24 parts by weight brown sugar, from about 5 parts to about 15 parts by weight pure, non-hydrogenated vegetable oil, from about one-half parts to about 3 parts by weight sugar solution, and sufficient water to provide a moisture content of from about 1.0 percent to about 3½ percent by weight in the finished product. After these ingredients are mixed, they are heated to a temperature of from about 140°F. to about 160°F. It is significant that the temperature must be at a certain elevation in order to provide for proper heating, stickiness, and melting of the mixture. However, the temperature cannot be sufficiently high as to cause degradation of the product. Therefore, it is necessary that the range of from about 140°F. to about 160°F. be somewhat closely controlled. After the coating material is heated, it is enrobed onto the base. This enrobing may be in a conventional cereal enrober. After the coating is enrobed onto the base, the entire coated base is then dried to below 3½ percent by weight moisture, leaving a product with a density of from about 0.15 oz. per cubic inch to about 0.35 oz. per cubic inch. If dehydrated fruit is to be included in the ready-to-eat cereal, then the dehydrated fruit is admixed with the dried enrobed base and at that point from about 5 to 25 parts by weight of the dehydrated fruits are added to the dried coated base. The final moisture of the product, including the fruit, must then fall within the range of from about 1.0 to about 5.0 percent by weight. We have found that an unusually good product can be produced by a process wherein the coated base is formed into a sheet, such as by depositing it on a moving belt, prior to drying and then subdivided to an average particle size of about one-fourth inch after drying. The resulting texture is excellent and the product is uniform in particle size and devoid of dust and fines which diminish acceptance.

DESCRIPTION OF THE PREFERRED EMBODIMENTS

The following examples are used to better illustrate, but not limit, the present invention.

EXAMPLE 1

A cereal base was prepared by admixing 31 parts by weight oat flakes, 15 parts by weight wheat flakes, 8 parts by weight almonds, 7½ parts by weight coconut, and 7½ parts by weight non-fat dry milk solids. These ingredients were thoroughly admixed in a mixer. A coating syrup was prepared by admixing 19 parts by weight brown sugar with 11 parts by weight coconut oil, 1½ parts by weight honey, and 10 parts by weight water. This coating material was mixed together and heated to a temperature of about 150°F. After the ingredients had been thoroughly mixed at the temperature, the base and coating were placed in a cereal enrober and the coating enrobed onto the cereal base. The product was then dried in an oven to a moisture content of about 3 percent by weight. The drying was accomplished in an oven having inlet air temperatures of between 270°F. and 290°F. but the temperature of the cereal was never high enough to substantially degrade either the cereal base or the coating thereon. The product thus produced was a highly desirable ready-to-eat cereal product of natural ingredients unadulterated by chemical addition.

EXAMPLE 2

Example 1 was repeated with the exception that the dried cereal product was admixed with about 8½ parts by weight raisins and about 8½ parts by weight dates. Again, the resulting product was a highly desirable, ready-to-eat cereal product.

The two examples listed hereinabove, with the processes used for making them, constitute the two most preferred embodiments of this invention.

This invention provides a new and novel ready-to-eat cereal product heretofore unknown. It is a highly desirable cereal product to a large segment of the population in that it is completely free from chemical addition. It is a product which is made from natural ingredients, but yet which is stable against rancidity and staling. It is a very tasty product having very good taste and texture characteristics. It is new and novel in that it has heretofore not been shown or made obvious by anything known prior to this invention.

Having provided a new and novel invention, we claim:

1. A ready-to-eat cereal of natural ingredients, said cereal consisting essentially of; a base and a coating thereon, said base comprising from about 30 to about 50 parts by weight cereal flakes, from about 5 to about 8 parts by weight coconut, from 0 to about 10 parts by weight milk solids, and from about 5 to about 9 parts by weight edible nuts; said coating comprising from about 12 to about 24 parts by weight brown sugar, from about 5 to about 15 parts by weight of pure non-hydrogenated vegetable oil, and from about one-half to about 3 parts by weight sugar; said cereal having a density of from about 0.15 to about 0.35 oz. per cubic inch and a moisture content of from about 1.0 to about 3½ percent by weight.

2. A ready-to-eat cereal product as in claim 1 wherein the cereal flakes comprises a member selected from the group oat flakes, wheat flakes, barley flakes, and mixtures thereof.

3. A ready-to-eat cereal product as in claim 1 wherein the edible nuts comprises almonds.

4. A ready-to-eat cereal product as in claim 1 wherein the pure, non-hydrated vegetable oil is coconut oil.

5. A ready-to-eat cereal product as in claim 1 wherein the pure, non-hydrogenated vegetable oil is a member selected from the group consisting essentially of palm oil, sesame oil, corn oil, cottonseed oil, and soybean oil.

6. A ready-to-eat cereal product as in claim 1 wherein the sugar solution is a member selected from the group consisting essentially of honey, molasses, maple syrup, and sucrose solutions.

7. A ready-to-eat cereal product as in claim 1 which also includes from 5 to 25 parts by weight dehydrated fruit and which has an overall moisture content of from about 1.0 to about 5.0 percent by weight.

8. A ready-to-eat cereal product as in claim 7 in which the dehydrated fruit is a member selected from the group consisting essentially of raisins, dates, and mixtures thereof.

9. A ready-to-eat cereal of natural ingredients, said cereal comprising from about 23 parts to about 27 parts by weight oat flakes, from about 11 parts to about 14 parts by weight wheat flakes, from about 6 parts to about 8 parts by weight almonds, from about 5 parts to about 8 parts by weight coconut, from about 5 parts to about 8 parts by weight milk solids, from about 14 parts to about 17 parts by weight brown sugar, from about 8 parts to about 11 parts by weight coconut oil, from about one-fourth parts to about 2½ parts by weight honey, from about 5 parts to about 13 parts by weight raisins, and from about 5 parts to about 13 parts by weight dates; wherein the density of said cereal is from 0.23 to 0.27 oz. per cubic inch and wherein the moisture content of said cereal is from about 1.0 percent to about 5.0 percent by weight.

10. A ready-to-eat cereal of natural ingredients, said cereal comprising from about 22 parts to about 28 parts by weight oat flakes, from about 8 parts to about 22 parts by weight wheat flakes, from about 7 parts to about 9 parts by weight almonds, from about 6 parts to about 8 parts by weight coconut, from about 6 parts to about 8 parts by weight milk solids, from about 17 parts to about 20 parts be weight brown sugar, from about 7 parts to about 13 parts by weight coconut oil, and from about one-fourth parts to 2½ parts by weight honey; wherein the density of said cereal is from about 0.16 to about 0.32 oz. per cubic inch and wherein the moisture of said cereal is from about 1.0 percent to about 3.5 percent by weight.

11. A process for producing a ready-to-eat cereal of natural ingredients said process comprising:
 a. preparing a base by admixing from about 30 parts to about 50 parts by weight cereal flakes with from about 5 parts to about 8 parts by weight coconut, from 0 parts to about 10 parts by weight milk solids, and from about 5 parts to about 9 parts by weight edible nuts;
 b. preparing a coating material by admixing from about 12 parts to about 24 parts by weight brown sugar, from about 5 parts to about 15 parts by weight pure; non-hydrogenated vegetable oil, from about one-half parts to about 3 parts by weight sugar solution and sufficient water to make the coating material liquid;
 c. heating the coating material to a temperature of from about 140°F. to about 160°F;
 d. enrobing the coating material onto the base; and
 e. drying the enrobed base to below 3½ percent by weight moisture to produce a product having a density of from about 0.15 oz. per cubic inch to about 0.35 oz. per cubic inch.

12. A process as in claim 11 wherein the cereal flakes comprises a member selected from the group oat flakes, wheat flakes, barley flakes, and mixtures thereof.

13. A process as in claim 11 wherein the edible nuts comprises almonds.

14. A process as in claim 11 wherein the pure, non-hydrogenated vegetable oil is coconut oil.

15. A process as in claim 11 wherein the pure, non-hydrogenated vegetable oil is a member selected from the group consisting essentially of palm oil, sesame oil, corn oil, cottonseed oil, and soybean oil.

16. A process as in claim 11 wherein the sugar solution is a member selected from the group consisting essentially of honey, molasses, maple syrup, and sucrose solutions.

17. A process as in claim 11 wherein the dried, enrobed base is admixed with from 5 to 25 parts by weight dehydrated fruit and the overall moisture content then falls within the range of from about 1.0 to about 5.0 percent by weight.

18. A process as in claim 17 wherein the dehydrated fruit is raisins and dates.

19. A process for producing a ready-to-eat cereal product of natural ingredients, said process comprising:
 a. preparing a base by admixing from about 22 parts by weight to about 28 parts by weight oat flakes, from about 8 parts by weight to about 22 parts by weight wheat flakes, from about 7 parts by weight to about 9 parts by weight almonds, from about 6 parts by weight to about 8 parts by weight coconut, and from about 6 parts by weight to about 8 parts by weight milk solids;
 b. preparing a coating material by admixing from about 17 to about 20 parts by weight brown sugar, from about 7 parts by weight to about 13 parts by weight coconut oil, and from about one-fourth parts by weight to about 2½ parts by weight honey, with sufficient water to make the coating liquid.
 c. heating the coating material to a temperature of from about 140°F. to about 160°F.;
 d. enrobing the coating material onto the base; and
 e. drying the enrobed base to below 3½ percent by weight moisture to give a product having a density of from 0.15 oz. per cubic inch to 0.35 oz. per cubic inch.

20. A process as in claim 19 wherein the dried, enrobed base is admixed with from 5 to 25 parts by weight dehydrated fruit and the overall moisture content then falls within the range of from about 1.0 to about 5.0 percent by weight.

21. A process as in claim 20 wherein the dehydrated fruit is raisins and dates.

22. A process for producing a ready-to-eat cereal of natural ingredients said process comprising:
 a. preparing a base by admixing from about 30 parts to about 50 parts by weight cereal flakes with from about 5 parts to about 8 parts by weight coconut, from 0 parts to about 10 parts by weight milk solids, and from about 5 parts to about 9 parts by weight edible nuts;
 b. preparing a coating material by admixing from about 12 parts to about 24 parts by weight brown sugar, from about 5 parts to about 15 parts by weight pure; non-hydrogenated vegetable oil, from about one-half parts to about 3 parts by weight sugar solution and sufficient water to make the coating material liquid;
 c. heating the coating material to a temperature of from about 140°F. to about 160°F.
 d. enrobing the coating material onto the base;
 e. forming the enrobed base into a sheet;
 f. drying the sheet of enrobed base to below 3½ percent by weight moisture to produce a product having a density of from about 0.15 oz. per cubic inch to about 0.35 oz. per cubic inch; and
 9. subdividing the dried sheet.

23. A process as in claim 22 wherein the cereal flakes comprises a member selected from the group oat flakes, wheat flakes, barley flakes, and mixtures thereof.

24. A process as in claim 22 wherein the edible nuts comprises almonds.

25. A process as in claim 22 wherein the pure, non-hydrogenated vegetable oil is coconut oil.

26. A process as in claim 22 wherein the pure, non-hydrogenated vegetable oil is a member selected from the group consisting essentially of palm oil, sesame oil, corn oil, cottonseed oil, and soybean oil.

27. A process as in claim 22 wherein the sugar solution is a member selected from the group consisting essentially of honey, molasses, maple syrup, and sucrose solutions.

28. A process as in claim 22 wherein the dried, enrobed base is admixed with from 5 to 25 parts by weight dehydrated fruit and the overall moisture content then falls within the range of from about 1.0 to about 5.0 percent by weight.

29. A process as in claim 28 wherein the dehydrated fruit is raisins and dates.

30. A process as in claim 22 wherein the subdivision comprises a particle size reduction wherein the average particle size is approximately one-fourth inch.

31. A process for producing a ready-to-eat cereal product of natural ingredients, said process comprising:
a. preparing a base by admixing from about 22 parts by weight to about 28 parts by weight oat flakes, from about 8 parts by weight to about 22 parts by weight wheat flakes, from about 7 parts by weight to about 9 parts by weight almonds, from about 6 parts by weight to about 8 parts by weight coconut, and from about 6 parts by weight to about 8 parts by weight milk solids;
b. preparing a coating material by admixing from about 17 to about 20 parts by weight brown sugar, from about 7 parts by weight to about 13 parts by weight coconut oil, and from about one-fourth parts by weight to about 2½ parts by weight honey, with sufficient water to make the coating liquid;
c. heating the coating material to a temperature of from about 140°F. to about 160°F.
d. enrobing the coating material onto the base;
e. forming the enrobed base into a sheet;
f. drying the sheet of enrobed base to below 3½ percent by weight moisture to give a product having a density of from 0.15 oz. per cubic inch to 0.35 oz. per cubic inch;
g. subdividing the dried sheet.

32. A process as in claim 31 wherein the dried, enrobed base is admixed with from 5 to 25 parts by weight dehydrated fruit and the overall moisture content then falls within the range of from about 1.0 to about 5.0 percent by weight.

33. A process as in claim 32 wherein the dehydrated fruit is raisins and dates.

34. A process as in claim 31 wherein the subdivision comprises a particle size reduction wherein the average particle size is approximately one-fourth inch.

* * * * *

UNITED STATES PATENT OFFICE
CERTIFICATE OF CORRECTION

Patent No. 3,876,811                     Dated April 8, 1975

Inventor(s) William A. Bonner, Max R. Gould, and Thomas E. Milling

It is certified that error appears in the above-identified patent and that said Letters Patent are hereby corrected as shown below:

Column 8, line 41 "9". should read --g.--

Signed and sealed this 15th day of July 1975.

(SEAL)
Attest:

RUTH C. MASON
Attesting Officer

C. MARSHALL DANN
Commissioner of Patents
and Trademarks